Dec. 30, 1941.                J. L. EVANS                2,268,069
                        PIPE JOINT FORMING DEVICE
                          Filed Feb. 6, 1940                2 Sheets-Sheet 1
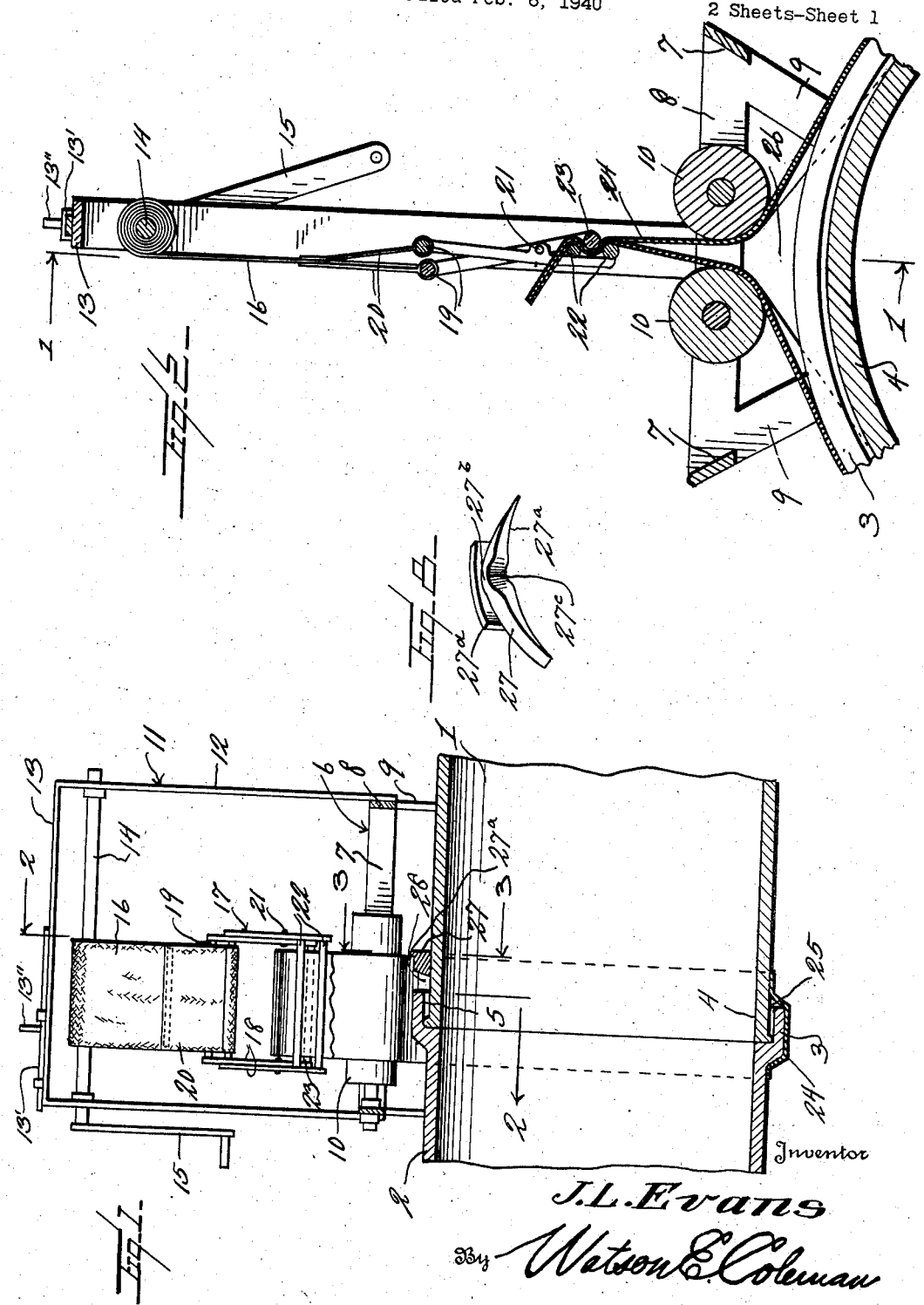
Inventor
J. L. Evans
By Watson E. Coleman
Attorney Dec. 30, 1941.　　J. L. EVANS　　2,268,069
PIPE JOINT FORMING DEVICE
Filed Feb. 6, 1940　　2 Sheets-Sheet 2
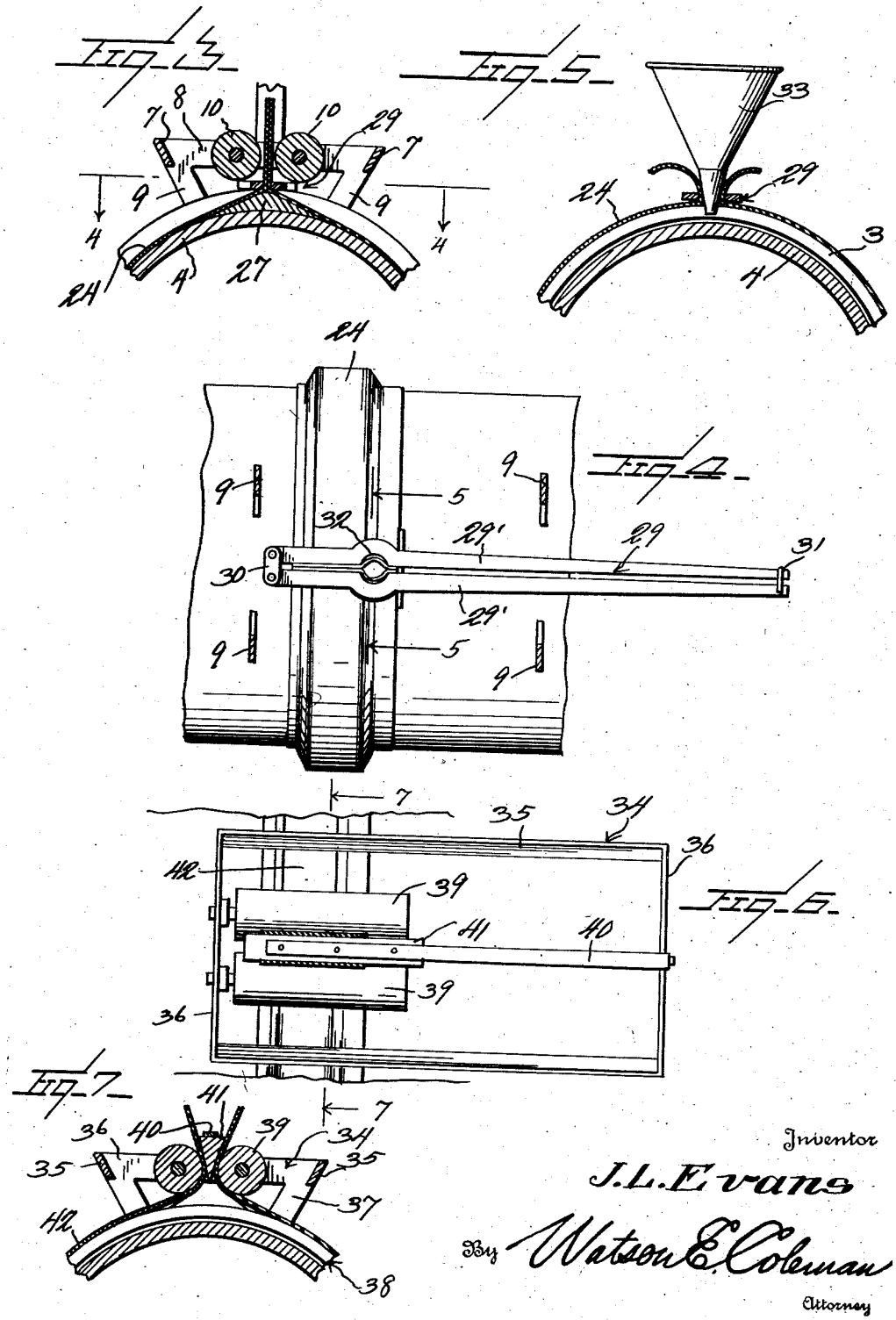

Patented Dec. 30, 1941

2,268,069

UNITED STATES PATENT OFFICE 2,268,069

PIPE JOINT FORMING DEVICE

James L. Evans, Baton Rouge, La.

Application February 6, 1940, Serial No. 317,600

11 Claims. (Cl. 25—127)

This invention relates to the art of forming pipe joints and pertains particularly to an improved device for facilitating the pouring of such joints.

The present invention has for its primary object to provide an improved apparatus by means of which the pouring of sealing or grouting material into a joint between two sections of pipe will be facilitated without such material adhering to the molding or shaping element employed whereby there will be produced a smooth clean joint which will effectively resist infiltration of fluids or the working of tree roots between the pipe sections and the passage of fluids from within the pipe outwardly is also prevented.

Another object of the invention is to provide a mechanism for facilitating the pouring of pipe joints, wherein there is employed a flexible or yieldable molding band between which and the body of the pipe a bonding or cementing material is placed and held until it has solidified in order to establish a firm joint, such device including means for drawing the said band firmly into position and holding it in such position while the bonding or grouting material is being poured and until it has become solidified.

A further object of the invention is to provide in a pipe jointing mechanism a novel molding band adapted to cover the joint and facilitate the flowing of bonding or cementing material thereinto, which may be readily shaped around the joint and which will withstand extensive temperature changes whereby it may be employed for the pouring of sealing material cold or hot depending upon the character of the material used.

A still further object is to provide a novel mechanism for facilitating the pouring of a pipe joint, which includes a high temperature resisting rubber mold band designed to be drawn into position around a joint and means facilitating the drawing of such band tightly about the joint and securing it while the joint cementing material is being formed and while it is hardening.

Still another object is to provide in a mechanism of the above stated character, means for mechanically drawing such band into working position or for manually performing this operation, prior to the application to the band of a novel clamping means which is so designed that cement material may be poured through it and into the area between the band and the pipe joint.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in section on the line 1—1 of Fig. 2, showing the mechanically operated form of the device embodying the present invention in operative position over a pipe joint.

Fig. 2 is a sectional view on the line 2—2 of Fig. 1.

Fig. 3 is a sectional view on the line 3—3 of Fig. 1 and showing the flexible band clamping means in position.

Fig. 4 is a sectional view on the line 4—4 of Fig. 3.

Fig. 5 is a partial sectional view taken on the line 5—5 of Fig. 4 and showing a pouring funnel placed in position in the band clamp.

Fig. 6 is a view in top plan of a manually operated form of the joint pouring device.

Fig. 7 is a sectional view taken substantially on the line 7—7 of Fig. 6.

Fig. 8 is a view in perspective of the filler plug employed in association with the diaper band.

Referring now more particularly to the drawings, a description will first be given of the form of the device shown in Figs. 1 to 4 inclusive, which form has been referred to as the mechanically operated form as distinguishing from the form shown in Figs. 6 and 7, where the pulling of the flexible mold band into position is accomplished manually.

In Fig. 1, the numerals 1 and 2 indicate adjacent ends of pipe sections in which the section 2 is provided with the usual enlarged flange 3 forming a collar into which an unflanged end 4 of the section 1 is inserted. In such pipe joints a slight space is left between the collar 3 and the inserted end 4, as indicated at 5, into which a cementing material is placed to establish a water and gas-tight joint. Such cementing material may be of any one of a large number of types to be found on the market, some of which are applied cold while others are applied hot, for the purpose of filling the annular recess 5 so as to lock the ends of the pipes securely together.

In order to facilitate the pouring of such sealing or cementing material in an expeditious manner and to form a smooth neat joint, the devices of the present application have been developed.

In carrying out the invention as disclosed in Fig. 1, there is provided an elongated rectangular frame 6 of suitable material having longitudinal side portions 7 and transverse end portions 8. The frame is provided with suitable legs 9 by which it may be supported upon the adjacent ends of two pipe sections to straddle the joint and to extend longitudinally of the pipes.

Rotatably supported between the end members or bars 8 of the frame are two parallel relatively closely spaced rollers 10, the purpose of which will be hereinafter pointed out.

Supported on the frame 6 in vertical position is an upright frame indicated generally by the numeral 11 and consisting of the end standards 12 and a top bar 13 connecting the standards and extending along the longitudinal center of the lower frame 6. This top frame or vertical frame 11 supports between its standards 12 a rotatable shaft 14 having at one end a turning means such as a crank 15 and secured to this shaft 14 is an end of a wind-up band or strap 16 of suitable material such as cotton belting or the like. The strap 16 supports a gripping unit indicated generally by the numeral 17 and comprising two pairs of crossed gripping members 18, each member of each pair being connected with a member of the other pair by the bar 19, and each of these bars being connected by a flexible strap extension 20 to an end of the wind-up strap 16. Thus it will be seen that when a pull is applied to these bars 19, each pair of crossed members which is pivotally joined together as indicated at 21, will be oscillated toward a parallel relation.

Connecting two opposite members of the two pairs of members 18 are two spaced gripping jaws 22 which are disposed upon the sides of the pivots 21 remote from the bars 19 and the remaining two opposite members 18 of the two pairs are connected together by a single jaw bar 23 which is arranged to move into position between the bars 22 when the gripper members are swung together or closed. By this construction a clamp or gripper is obtained which normally tends to close so that when a body is disposed between the opposed jaws 22—23 and an upward pull placed thereon by winding up the strap 16 upon the shaft 14, the jaws will be drawn into tighter gripping relation with the body.

The numeral 24 constitutes an elongated band of rubber or other suitable elastic material and constitutes the body designed to be gripped between the jaws 22—23 of the gripper unit. This band 24 is preferably, although not necessarily, shaped initially to fit around a pipe joint of a particular diameter and is also preferably, though not necessarily, somewhat transversely shaped to fit over a joint in the manner shown in the lower part of Fig. 1. This band constitutes a flexible mold form in which the joint is enclosed and in placing the band or diaper in position around the joint, it is first arranged to encircle the joint in the manner illustrated, the free ends of the diaper band being brought together above the joint and passed upwardly between the pair of rollers 10 and placed between the gripping jaw members 22—23 to be held thereby. The shaft, constituting a winch, is turned to draw up the band or strap 16 and thus exert an upward pull on the ends of the diaper band 24. This tends to stretch the band 24 and cause it to shape itself tightly around the joint but leaving at the free edge of the collar 3, a circumferential space 25 communicating with the area 5 into which the sealing compound is introduced.

As will be noted upon reference to Fig. 2, when the ends of the diaper band 24 are drawn upwardly between the rollers 10, there will be left at the top of the joint a substantially V-shaped open area 26, which area must be closed between the outer surface of the pipe 1 and the adjacent edge of the band 24 so that the annular space 25 will be closed entirely around the pipe. This open area 26 is closed by inserting a rubber block or plug indicated generally by the numeral 27, the under face of the plug being arcuately curved, as indicated at 27$^a$ to fit the top of the pipe while the top surface tapers from the transverse center at 27$^b$ from a maximum thickness toward each end as shown. One vertical side face of the plug is slightly recessed, as indicated at 27$^c$, this being the inner face which is opposed to the flange 3. Upon the opposite vertical face there is formed the upstanding flange 27$^d$ which covers the major portion of the transverse center of the plug body and projects above the top of the same, as shown. The top surfaces of the plug at the two sides of the portion of major thickness form substantially an inverted V, and these surfaces have the diaper band extended thereover to the rollers 10, as shown in Fig. 3, thus substantially closing the area 26, the flange 27$^d$ having the adjacent edge of the band 24 extending across its inner face.

After the diaper band has been placed in position around the joint as illustrated and described and drawn tightly into place so that it will form a tight joint or contact with the surfaces of the two pipe ends, the tightening or drawing means consisting of the frame, rollers and gripper, is removed, but before this structure is taken away, the ends of the diaper band are securely clamped together directly over the top of the plug body 27 and between this body and the rollers 10, as shown in Fig. 3. In order to hold the winch shaft 14 against turning while the hereinafter described clamp is being applied, the top bar 13 has mounted thereon a sliding latch 13' which may be shifted by the finger 13'' into a position where it will obstruct the turning of the crank 15 and thus hold the shaft against rotation. The clamp employed is shown in Fig. 4 and indicated generally by the numeral 29 and consists of two bar members 29' pivotally coupled together at one end, as indicated at 30, so that they may be swung into substantially parallel relation and having at their other ends means, such as the ring 31, for joining such ends together. These bars are provided at directly opposite points with lateral recesses 32 which together provide a substantially circular opening between the bars. The bars 29' of the clamp are placed upon opposite sides of the two ends of the diaper band 24 beneath the rollers 10 as previously stated, and are then closed as shown in Fig. 4, so as to squeeze the two ends of the band firmly together. The distance of the lateral recesses 32 from the pivotally joined ends of the bars is such that the recesses may be disposed directly above the space 28 which is left between the filler plug 27 and the free edge of the collar 3. When the ends of the band 24 are thus clamped firmly together and the bars secured together by the locking ring 31, the gripper suspended by the strap 16 may be released so that the frame structure 6 can be taken away. A funnel or other suitable guide 33, Fig. 5, is then placed in position with its outlet end extended downwardly between the gripped ends of the band 24 in the space provided by the opposing recesses 32, extending through the recess 27c of the plug between the plug and the pipe flange 3, so that cementing or bonding material poured into the funnel will be directed through the space 28 into the annular space 25 and the area 5 between the collar or flange 3 and the inserted portion 4 of the adjacent pipe. After the sealing material has been poured into the joint, the molding diaper band may be left in place until the material has set or hardened and when removed it will be found that the band has shaped the bonding material into a smoothly finished joint.

As previously stated, certain of the sealing materials or compounds are intended to be poured cold while others are poured hot, therefore, the rubber diaper band 24 will be made of a suitable special rubber, which may be obtained from rubber manufacturers, which will withstand a temperature of at least 400° F.

Where other types or grades of rubber material might be found useful from an economical standpoint, protection may be given to the rubber when using hot joint sealing compounds by inserting between the band 24 and the joint, a band of a heat resisting material such as asbestos paper, oiled paper, building felt or the like. Such a liner between the rubber band and the pipe bodies would prevent damage being done to the rubber band by hot sealing compound. It will be understood, of course, that such liners would be shaped or molded in a size to fit the various joints to be grouted.

In Figs. 6 and 7 a slightly modified form of the mechanism employed for applying the elastic molding diaper is shown. In this modified form the diaper is drawn tight by hand, therefore, the winch and gripper units shown in the form illustrated in Fig. 1 are eliminated. In the hand or manually actuated form of the invention there is provided a pipe supported elongated rectangular frame 34 of the same form as the frame 6, having the longitudinal side portions 35 and the transverse end portions 36 with suitable legs 37 for supporting the frame horizontally above and longitudinally of the pipes over the joint, here indicated generally by the numeral 38.

Supported from an end bar 36 to extend longitudinally of the frame as shown, are two rollers 39 which are arranged in spaced parallel relation and secured to the opposite end bar 36 of the frame is a relatively long flat spring 40 which extends longitudinally of the frame and above and centrally between the rollers 39 as illustrated in Fig. 7. This spring bar is secured to the downwardly tapering elongated wedge 41, the edge of which wedge is directed down between the rollers and the wedge is normally forced into contact with the rollers by the spring.

In the use of the manually operated form of the invention, after the diaper band, here indicated by the numeral 42, has been placed in position around the joint 38, the ends of the band are passed upwardly between the rollers 39, each passing between a tapered face of the wedge 41 and a roller so that when the wedge is released, it will move downwardly and tend to secure or bind the ends of the band between its side faces and the opposing rollers. The user of the device stands over or upon the frame 34 and, gripping an end of the band 42 in each hand, pulls upwardly thereon so as to stretch the band tightly around the joint. This upward pulling of the band ends will, of course, tend to raise the wedge 41 against the tension of the spring 40, but as soon as the band ends are released, the spring will force the wedge 41 back between the rollers and will grip and hold the ends of the band.

While Figs. 6 and 7 do not illustrate the use of the plug such as is indicated in Fig. 3 by the numeral 27, it will be understood that such plug will be used in this hand operated form of the invention and also that the clamp shown in Fig. 4 will be placed in position between the rollers 39 and such wedge to grip the ends of the diaper band and securely hold the band so that the frame structure 34 may be removed. After removal of the frame 34 then a filling funnel will be placed in position between the ends of the band in exactly the same manner as illustrated in Figs. 4 and 5.

In the construction of the frames 6 and 34, the supporting legs therefor will be made of such height as to bring the rollers as closely as possible to the joint, thus making it possible to draw the ends of the diaper bands very close together so that only a relatively small filler plug need be used. This will also make easier the gripping and holding of the ends of the bands tightly over the filler plugs by the clamp.

The invention herein disclosed has the advantages that the sealing or bonding cement will not adhere to the rubber diaper bands which are employed and, therefore, such bands may be used over and over indefinitely. It also has the advantage that the joints may be formed under water or in water for the reason that water is a lubricant for rubber and causes it to pull easier than it would do if it were used or drawn over dry material, therefore, the device will actually work better in mud and water than in a dry location. A third advantage of the present device is that nicks and chips or flaws in sewer pipes are immaterial since the rubber diaper band draws down tight on the collar or hub and the pipe so as to close all of such nicks and uneven places. Another advantage in the present device is that it saves time over other devices now in use since the setting of the winch or frame structure, pulling the rubber and applying the tongs and pouring the grout or cement material in the joints requires more nearly a matter of seconds than minutes in time.

Other advantages are that while it may not completely eliminate the existing hazards of root growth in the joints, it greatly improves over the present used combination grout and cement methods of joining pipes and all cement mortar joints, and the device facilitates the formation of joints which, though they may not completely prevent infiltration and exfiltration which causes expensive pumping and undermining of streets, will form joints which will be a vast improvement over joints formed at the present time by the grouting methods now in use and, therefore, will reduce infiltration and exfiltration to such an extent that the making of expensive repairs in streets will be practically eliminated.

Another advantage of the present device is that the formation of air pockets in the sealing material, resulting in faulty joints, is eliminated. At the present time it frequently occurs that in pouring the grouting material into the joint air pockets are formed and the air cannot escape and, therefore, when the grouting material sets or hardens, these pockets remain to cause trouble whereas in the present invention, owing to the pliability of the rubber diapers, the grout can be pulled or rubbed by working the molding band so as to force out all of the air that may have gotten trapped in the pouring of the grout, thereby causing the sealing material to completely fill the joint.

In cases where it may be found desirable to use a protecting sheet of heat resisting material between the rubber diaper and hot sealing material, the inserted protective band may be provided with a coating of paraffin, chalk or a cold water paint, if found desirable, to avoid the possibility of adhesion between the sealing compound and the lining.

What is claimed is:

1. Mechanism for pouring and molding sealing material in a pipe joint, comprising a frame adapted to rest over a joint between two interconnected ends of two pipes, a pair of spaced parallel guides carried by the frame for disposition over said joint, a band of material adapted to encircle a joint and have its ends passed upwardly between said guides, means for securing the ends of the band adjacent to said guides to maintain the band in firm encircling relation with the joint, and means for clamping the ends of the band together beneath the guide to draw the ends into closer relation with the pipes and to hold the band upon removal of the frame.

2. Mechanism for pouring and molding sealing material in a pipe joint, comprising a frame adapted to rest over a joint between two interconnected ends of two pipes, a pair of spaced parallel guides carried by the frame for disposition over said joint, a band of material adapted to encircle a joint and have its ends passed upwardly between said guides, means for securing the ends of the band adjacent to said guides to maintain the band in firm encircling relation with the joint, means for clamping the ends of the band together beneath the guide whereby the first securing means may be released and the frame removed, said band end clamping means comprising a pair of relatively movable jaw members adapted to squeeze the ends of the band together, and the means facilitating the introduction of the sealing material beneath the band comprising opposing recesses in adjacent edges of the clamping members into which opposing portions of the band ends may be moved to provide an opening through which said material may be passed.

3. Means for pouring and molding a sealing material in a joint between two interconnected pipe ends, comprising a frame structure adapted to be disposed over said joint, a band of elastic material designed to encircle the joint to have its ends brought together within the frame, means carried by the frame forming a pair of spaced guides between which the ends of the band are drawn upwardly, means associated with and disposed adjacent to said guides for holding the said ends of the band, the said band ends being drawn upwardly between said guides whereby to stretch the band around the joint, a clamp member for securing the said ends of the band together beneath said guides whereby the frame guides and holding means may be removed, and means whereby a sealing material may be passed between the clamped ends of the band into the joint beneath the band.

4. Means for pouring and molding a sealing material in a joint between two interconnected pipe ends, comprising a frame structure adapted to be disposed over said joint, a band of elastic material designed to encircle the joint to have its ends brought together within the frame, means carried by the frame forming a pair of spaced guides between which the ends of the band are drawn upwardly, means associated with and disposed adjacent to said guides for holding the said ends of the band, the said band ends being drawn upwardly between said guides whereby to stretch the band around the joint, a clamp member for securing the said ends of the band together beneath said guides whereby the frame guides and holding means may be removed, and means whereby a sealing material may be passed between the clamped ends of the band into the joint beneath the band, said band being formed of rubber having a high degree of resistance to heat.

5. A device for pouring and molding sealing compound in a joint between two interconnected pipe ends, comprising a frame, means for supporting the frame horizontally over said joint, a pair of elongated guide members carried by the frame and extending in spaced parallel relation for support by the frame longitudinally of the pipes over the joint, a band of elastic material for encircling said joint, the ends of the band being extended between said guides to be drawn upwardly for the purpose of stretching the band and establishing tight contact between the edges of the same and the pipes, means for holding the said ends of the bands at the guides, clamping means comprising a pair of relatively movable jaws adapted to be disposed beneath the guides to compress the ends of the band together to hold the band in stretched condition for removal of the frame guides and securing means, a filler member disposed beneath the ends of the band and between a pipe and said clamp means, and means forming a part of said clamping means by which the introduction of sealing material between the clamped ends of the band for distribution between the band and the joint may be accomplished.

6. A device for facilitating the pouring and molding of sealing material in a joint formed between interconnected ends of two pipes, comprising a frame, means for supporting the frame over the joint on the pipes, a pair of spaced parallel guide rollers rotatably supported in the frame to extend longitudinally of the pipes over the joint, a gripper member supported above the frame, an elastic band designed to encircle the joint and having its ends extended between said guides to be engaged by said gripper member, means for shifting the gripper member away from the guides to effect the stretching of the band, a clamp designed to be disposed beneath said guides to secure the ends of the stretched band together whereby the frame, guides and gripper member may be removed, a closure plug inserted between the band and one pipe at one side of the joint, and means comprising a part of said clamp by which the introduction of a sealing material between the clamped ends of the band to flow between the band and the joints at the inner side of said plug may be accomplished.

7. A device for facilitating the pouring of sealing material into a joint formed by interconnected ends of two pipes, comprising a frame, means for supporting the frame upon the pipes over said joint, a second frame carried by the first frame, a shaft rotatably supported by the second frame, a strap of inelastic material connected with and adapted to be wound up around the shaft, a gripper member carried by and suspended from an end of the strap, a material guide and molding strip of elastic material designed to encircle said joint and to have its ends brought together above the joint and secured by said gripping means, means for turning the shaft for the stretching of said elastic strip around the joint, means for clamping the ends of the elastic strip close to said joint to prevent contraction of the strip and allow for the removal of the frame and gripping means, and means comprising a part of the clamping means facilitating the introduction of sealing material between the ends of the strip for distribution around the joint under the elastic strip.

8. A device for facilitating the pouring of sealing material into a joint formed by interconnected ends of two pipes, comprising a frame, means for supporting the frame upon the pipes over said joint, a second frame carried by the first frame, a shaft rotatably supported by the second frame, a strap of inelastic material connected with and adapted to be wound up around the shaft, a gripper member carried by and suspended from an end of the strap, a material guide and molding strip of elastic material designed to encircle said joint and to have its ends brought together above the joint and secured by said gripping means, means for turning the shaft for the stretching of said elastic strip around the joint, means for clamping the ends of the elastic strip close to said joint to prevent contraction of the strip and allow for the removal of the frame and gripping means, said clamping means comprising two spaced bar members pivotally connected together at one end and having means for detachably securing the opposite ends together, and means facilitating introduction of sealing material between the band ends for distribution around the joint under the elastic strip, comprising opposite recesses in said bars into which adjacent portions of the band ends may be pressed to be separated.

9. Means for facilitating the pouring and molding of sealing compound in a joint between interconnected ends of two pipes, comprising a frame adapted to be supported over said joint, a pair of guides supported in spaced parallel relation by the frame to extend longitudinally of the pipes, a strip of elastic material designed to encircle the joint with its ends extended upwardly between the guides, a wedge member adapted to position between said guides and between the ends of said strip, resilient means normally urging the wedge member into position between the guides and connecting the wedge member with the frame, a clamp for securing said band ends together beneath said guides, the clamp including a pair of elongated members adapted to be brought into gripping relation upon opposite sides of the band ends, said gripping members having in their opposed edges oppositely positioned inwardly opening recesses into which adjacent portions of the band ends may be pressed to provide an opening through which sealing material may be poured.

10. Means for facilitating the pouring and molding of sealing compound in a joint between interconnected ends of two pipes, comprising a frame adapted to be supported over said joint, a pair of guides supported in spaced parallel relation by the frame to extend longitudinally of the pipes, a strip of elastic material designed to encircle the joint with its ends extended upwardly between the guides, a wedge member adapted to position between said guides and between the ends of said strip, resilient means normally urging the wedge member into position between the guides and connecting the wedge member with the frame, a clamp for securing said band ends together beneath said guides, the clamp including a pair of elongated members adapted to be brought into gripping relation upon opposite sides of the band ends, said gripping members having in their opposed edges oppositely positioned inwardly opening recesses, said recesses coacting to facilitate the separation of adjacent portions of the ends of the elastic strip for the introduction of a sealing material between the strip and the joined ends of the pipes, and means positioned upon one pipe at one side of the joint beneath the clamp and between the convergent ends of the elastic strip and the pipe for preventing the escape of sealing material laterally from beneath the strip.

11. Mechanism for pouring and molding sealing material in a pipe joint, comprising a band of material of substantial width and length designed to encircle and cover the joint and having its ends brought together at one side of the joint, means for gripping said ends and for applying a pull thereto to draw the band tightly into position in covering relation with the joint, means insertible between the joint and said first means and across the engaged ends of the band for gripping said ends and drawing the same together in closer relation with the joint, and means forming a part of said gripping means for facilitating the separation of opposing portions of the gripped ends to provide an opening through which a sealing material may be introduced into the joint under said band.

JAMES L. EVANS.